United States Patent [19]

Owsen

[11] Patent Number: 4,568,294
[45] Date of Patent: Feb. 4, 1986

[54] ALL-TERRAIN VEHICLE

[76] Inventor: Paul J. Owsen, 1772 Indian Woods Dr., Traverse City, Mich. 49684

[21] Appl. No.: 461,813

[22] Filed: Jan. 28, 1983

[51] Int. Cl.$^4$ .............................................. B63H 1/34
[52] U.S. Cl. ..................... 440/95; 114/270; 114/313; 114/333; 305/35 EB
[58] Field of Search ............... 114/58, 67 R, 121, 312, 114/313, 330, 333, 337, 270, 125; 440/90, 95–100; 305/35 EB, 39, 47; D12/141–145; D15/24

[56] References Cited

U.S. PATENT DOCUMENTS

| | | | |
|---|---|---|---|
| D. 48,885 | 4/1916 | Downing | D12/141 |
| D. 111,859 | 10/1938 | Peterson | D12/142 |
| 2,091,958 | 9/1937 | Braga | 440/95 |
| 2,377,143 | 5/1945 | Golden | 114/67 R |
| 2,486,049 | 10/1949 | Miller | 440/5 |
| 2,898,965 | 8/1959 | Eddy | 305/35 EB |
| 2,914,017 | 11/1959 | Ruger | 44/95 |
| 3,205,852 | 9/1965 | Shepard | 440/95 |
| 3,311,424 | 3/1967 | Taylor | 305/12 |
| 3,385,255 | 5/1968 | Raymond et al. | 114/270 |
| 3,397,668 | 8/1968 | Mainguy | 114/270 |
| 3,476,072 | 11/1969 | Wilson | 440/5 |
| 3,500,648 | 3/1970 | Daniell | 114/313 |
| 3,509,721 | 5/1970 | Crawford | 60/53 |
| 3,760,763 | 9/1973 | Brusacoram | 114/270 |
| 3,901,177 | 8/1975 | Scott | 440/5 |
| 3,934,943 | 1/1976 | Gage | 305/35 EB |
| 3,971,597 | 7/1976 | Wright | 305/10 |
| 4,026,376 | 5/1977 | Gee | 114/313 |

FOREIGN PATENT DOCUMENTS 1076522 2/1960 Fed. Rep. of Germany ...... 114/270

Primary Examiner—Trygve M. Blix
Assistant Examiner—Stephen P. Avila
Attorney, Agent, or Firm—Krass & Young

[57] ABSTRACT

An all-terrain vehicle driven by endless propulsion tracks. The wheels are sufficiently bouyant to maintain the upper section of the endless track above the water line when the vehicle is fully loaded. A series of generally linear cleat segments project from the outer surface of the endless track and extend substantially across the width of the track. The cleat segments are arranged in a zig-zag pattern about the length of the endless track in order to provide a combination of forward and lateral thrust components as the endless track is rotated about the wheels. The generally longitudinal character of the cleat pattern reduces the chance of mud and loose soil being carried on the cleats to the top portion of the endless track.

11 Claims, 5 Drawing Figures

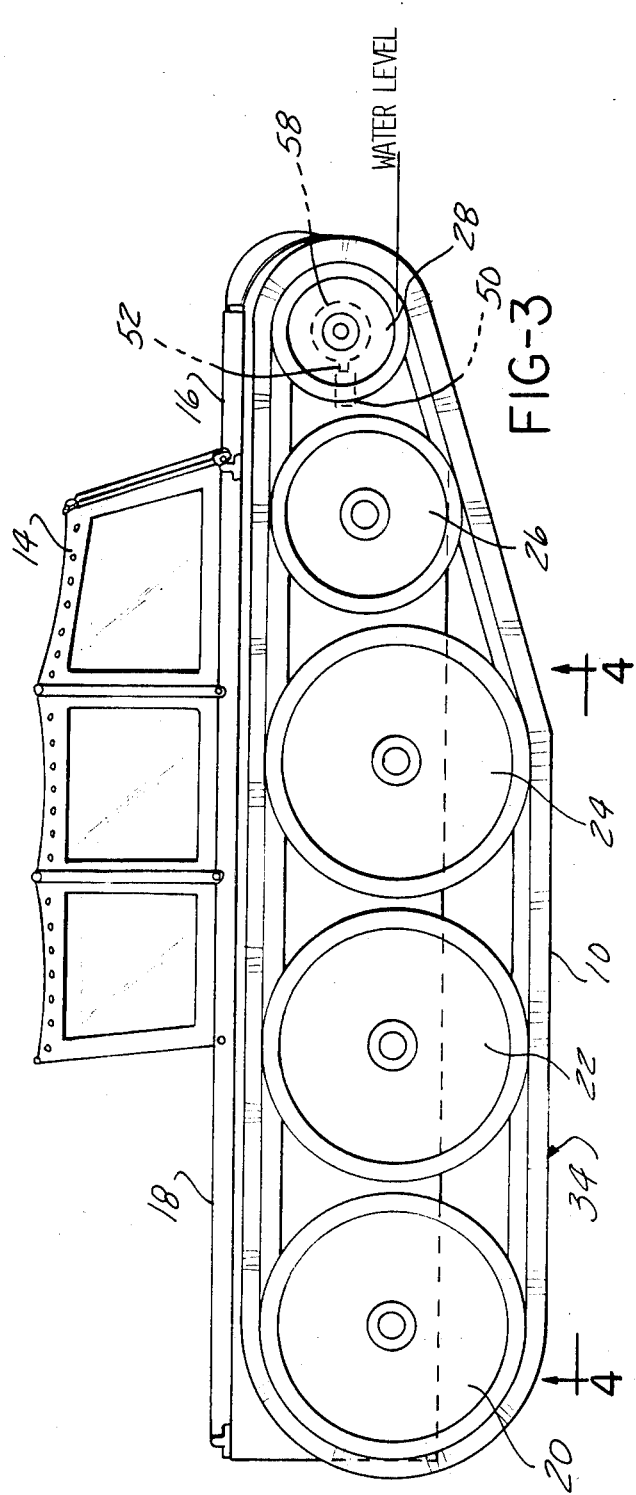
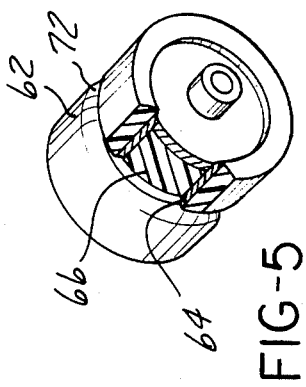
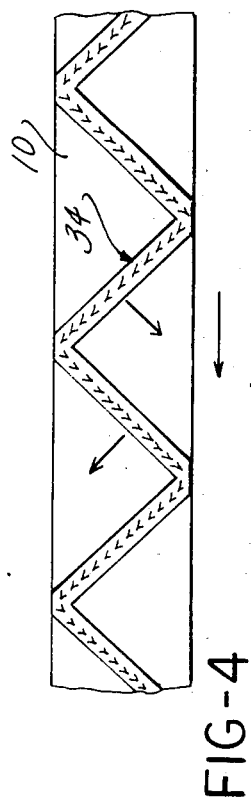

ALL-TERRAIN VEHICLE

TECHNICAL FIELD

This invention relates generally to all-terrain amphibious vehicles and more particularly to vehicles driven by endless tracks.

BACKGROUND ART

All-terrain amphibious vehicles which employ endless tracks as means for propulsion are widely known in the art. However, there are several problems associated with the use of endless propulsion tracks which greatly reduce the performance and maneuverability of the vehicles, both on land and in the water.

In many of the known designs, the forces necessary to propel the vehicle are generated by the endless track by virtue of a series of projections or cleats extending substantially across the width of the outer surface of the track. The cleats are are generally oriented perpendicular to the path of travel of the endless tracks. Thus, as the endless track is rotated, the action of the cleats on the terrain generates sufficient propulsion to provide for forward motion. However, in muddy or loose soil, these cleats tend to carry the mud or loose soil onto the track thus increasing the weight of the propulsion mechanism and decreasing its efficiency. In addition, the propulsion forces generated by the cleats are generally in a rearward direction, and provide little or no lateral stability to the vehicle.

U.S. Pat. No. 3,311,424 to Taylor, issued Mar. 28, 1967 discloses a track device comprising a belt driven soft roller. One embodiment of the Taylor device discloses a cleat arrangement in the form of a series of chevrons which extend across the width of the belt. While this cleat arrangement provides propulsion forces containing vector components in a lateral direction with respect to the vehicle, these lateral components are directed inwardly towards the center of the cleat and, thus only marginally affect the lateral stability of the vehicle. In addition, mud and loose soil may collect at the center point of each of the chevron cleats as the track moves over the terrain.

U.S. Pat. No. 2,091,958 to Braga issued on Sept. 7, 1937, discloses a boat employing an endless propulsion belt. Braga further employs a series of stationary baffles which remove water which has accumulated on the surface of the belt. It should be noted that until the boat has reached cruising speed, the water line is above the entire belt mechanism. Since the motion of the upper surface of the belt is in a direction opposite to that of the lower surface of the belt, a considerable amount of drag is created.

The present invention is directed to overcoming one or more of the problems as set forth above.

DISCLOSURE OF THE INVENTION

In accordance with one aspect of the present invention, an all-terrain vehicle is driven by specially designed endless propulsion tracks. A series of generally linear cleat segments projecting from the outer surface of the endless track and extending substantially across the width of the endless track generates propulsion forces which drive the vehicle. These cleats are arranged in a zig-zag pattern about the length of the endless track in order that the propulsion forces generated by the cleat segments have oppositely directed lateral components as well as forward thrust components. The lateral force components are directed outwardly from the endless track and provide increased lateral stability for the vehicle. In addition, the construction of the cleat pattern reduces the likelihood of mud and loose soil being carried by the cleats to the top of the belt.

In one embodiment of the invention, the endless track is mounted upon a series of wheels positioned along the length of the vehicle. Each of the wheels is large enough in diameter that it supports internal portions of both the upper surface and lower surface of the endless track.

In one embodiment, the wheels are each filled with a lightweight material such as styrofoam plastic, to increase their buoyancy. These large buoyant wheels serve to keep the upper portion of the endless propulsion track above the water level even when the vehicle is in a fully loaded condition. In addition, one or more of the forward-most wheels are of a reduced diameter and are mounted such that the outline of the endless track, when viewed from the side of the vehicle, defines an upward sloping surface along the front lower portion of the track. As the vehicle moves forward in the water, this sloping surface contacts the water in such a way that it tends to lift the front end of the vehicle further out of the water, thus further reducing the drag.

To prevent any lateral slippage of the endless track across the surface of the wheels, a slot is provided in the center of each of the wheels along their circumference which engages a centered ridge projecting along the entire length of the inner surface of the endless track. This ridge-slot arrangement, together with the cleat configuration, keeps the track centered on the wheels.

In an alternative design the vehicle may be employed as a submarine. The wheels, in this embodiment, are hollow and may be selectively filled to cause the vehicle to submerge.

BRIEF DESCRIPTION OF THE DRAWINGS

FIG. 3 is a side view of embodiment of the invention;

FIG. 4 is a bottom view of portions of the endless propulsion track viewed along lines 4—4 of FIG. 3; and FIG. 5 is a fragmented perspective view of a wheel assembly for the one embodiment.

BEST MODE FOR CARRYING OUT THE INVENTION

Figure 1:
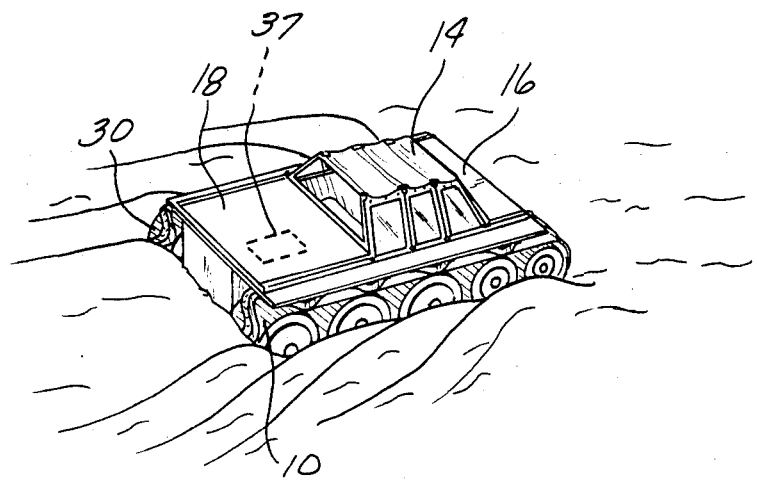
FIG. 1 is a perspective view of one embodiment of the present invention.

Referring to FIG. 1, one embodiment of the current invention is shown in operation in water. The vehicle is propelled through the water by a pair of endless propulsion tracks 10 and 30 located on either side of the vehicle. The tracks are supported and completely surround a series of large buoyant wheels 20-28. Other features shown which may be included in an embodiment of the invention are a portable cockpit cover 14, which may be made of canvas of similar material, a storage compartment 16 for the portable cockpit cover, and an engine and general storage compartment 18 and a pair of side curtains 12 and 32 which cover the top surface of the endless propulsion tracks 10 and 30.

Figure 2:
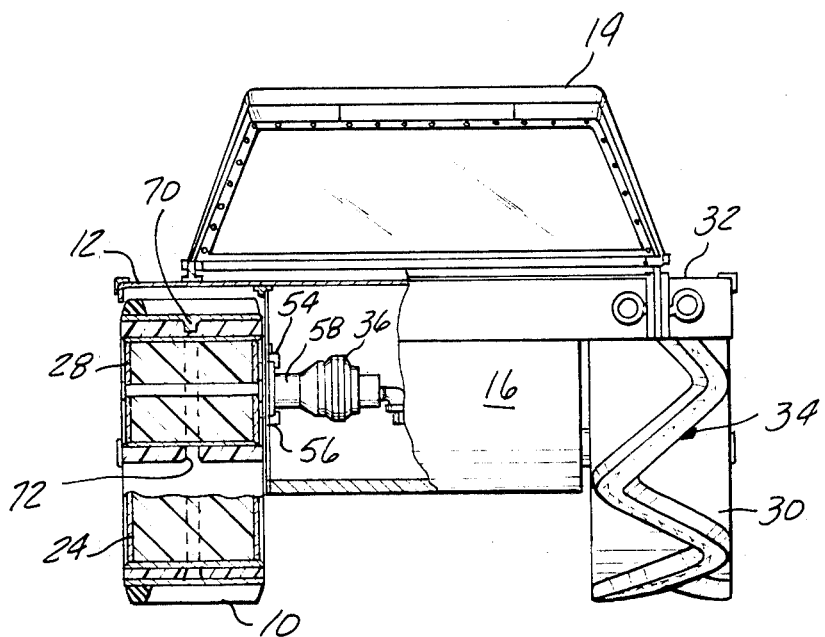
FIG. 2 is a fragmented end view of one embodiment showing the front left drive wheel assembly in cross-section.

Referring now to FIGS. 2 and 4, a continuous cleat 34 is secured to the top surface of the endless track 10 for the purpose of providing propulsion forces on land and water. It should be noted that the cleat design shown is a zig-zag pattern which extends about the entire length of the outer surface of the endless tracks.

The smaller front wheels 28 for each track are rotated by separate hydraulic motors, one of which is shown in FIG. 2 as motor 36. The hydraulic motors are, in turn, powered by a single air cooled gasoline engine 37 driving a pair of variable hydrostatic pumps (not shown), one for each motor, mounted in compartment 18. A set of manual levers (not shown in the cockpit are used to control the pumps which, in turn, control the rotational speed and direction of motors 36.

The front wheels 28 serve as driver pulleys for their respective tracks. Wheels 28 are positioned in frictional contact with the inner surface of the track to thereby transfer their rotational movement into corresponding rotation of the engaged track. In the preferred embodiment, control of the tension on the tracks is accomplished by way of a pair of hydraulically actuated cylinders, one for each of the front wheels 28. In FIG. 1, cylinder 50 is shown with a piston 52 positioned perpendicular to the axis of rotation of the wheel 28. As shown in FIG. 2, wheel 28 is slidably mounted within flanges 54, 56 in a horizontal direction. Piston 52, when actuated, presses on an extension 58 of the wheel shaft and causes the wheel to move press against the track and hold it taut.

Referring now to FIG. 3, it should be noted that each of the drive wheels 20–28 is of sufficient diameter that the endless track 10 surrounds the wheels and contacts each of the wheels on both its upper and lower outer surfaces. In the embodiment shown, the forward wheels 28 and 26 are of a smaller diameter than the three rear wheels 20–24. Mounting each of these wheels so that their top surfaces are aligned with the top surfaces of the larger rear wheel provides the endless track 10 with an upward sloping contact surface in the lower front area of the track assembly. When the vehicle is travelling in a forward direction in the water, the water first contacts this upward sloping surface, thus providing lift forces which tend to further raise the vehicle in the water and reduce drag. As will be appreciated by one skilled in the art, the number of reduced diameter forward wheels may be altered if a sharper or more gradual forward slope is desired.

Referring now to FIG. 5, each of the wheels 20–28 is composed of several different lightweight materials. The outer shell 62 may be made of a rigid molded plastic material. An intermediate layer 64 composed of glue or similar adhesive secures the outer layer 62 to the inner layer 66 which may be composed of a lightweight material such as styrofoam plastic. Because a substantial portion of the volume of these wheels is composed of a lightweight material such as styrofoam, the use of relatively large size wheels 20–28 greatly increases the buoyancy of the vehicle. Thus, the water level for the vehicle of the present invention is below the upper portion of the endless track 10, eliminating any negative propulsion forces that might be generated if the upper portion of the track 10 were submerged and greatly increasing the net propulsion forces in the forward direction.

However, it has been discovered that the unique cleat design still provides adequate forward propulsion even if the upper portion of the track is below water level. Consequently, the vehicle can be easily modified so as to serve as a submarine. Such modifications would include a water tight enclosure for the cockpit area and the use of hollow wheels which may be selectively filled with water or the like serving as ballast to cause the vehicle to submerge.

FIG. 4 shows in more detail the zig-zag pattern of the cleat 34 on the endless propulsion track 10 used in the preferred embodiment of the present invention. The track and cleat may be made of any suitable material. In this embodiment the track measures 27 feet in length and 16 inches in width made of fiber reinforced neoprene rubber. The cleats which extend several inches from the major surface of the track can be made of similar rubber or plastic material. Each linear segment of the cleat 34 extends substantially across the width of the endless track 10 at an angle of approximately 45 degrees relative to the edge of the endless track 10. Each of the segments are connected to immediately adjoining segments to form a 90 degree zig-zag pattern that runs the entire length of the endless propulsion track 10. It should be noted that the propulsion force generated by each of the cleat segments contains components in outwardly opposing lateral directions as well as in the direction of travel of the vehicle, as shown by the arrows. The lateral forces generated by each of the cleat segments tend to increase the lateral stability of the vehicle and keep the track centered on the wheels. It will also be appreciated by those skilled in the art, that because each of the cleat segments is oriented upon the endless track 10 in a diagonal fashion, the individual cleat segments are less likely to carry mud and loose soil up to the top surface of the endless track.

Referring again to FIG. 2, the endless propulsion track 10 may be provided with a center ridge 70 which extends along the length of the inside surface of the endless propulsion track 10 and engages a slot 72 located in the center of the surface of each of the wheels. The center ridge 70 prevents lateral slippage of the endless propulsion track 10 from the top surface of the wheels 20–28.

Other aspects, objects and advantages of this invention may be obtained from a study of the drawings, the disclosure and the appended claims.

I claim:

1. In a vehicle having an endless driven propulsion track with an outer surface, the improvement comprising:
   a continuous cleat comprising a series of generally linear segments projecting from the outer surface of the track and extending substantially across the width of the track, each of said segments being disposed at an angle of approximately 90 degrees relative to the immediately adjacent segment, the ends of each of the segments being connected to the ends of each of the adjacent segments, the series of segments forming a zigzag pattern along the length of the outer surface of the track whereby, upon driving motion of the track adjacent segments generate propulsion forces having oppositely directed outward lateral components to stabilize the vehicle.

2. The improvement of claim 1 wherein said track is made of a resilient material.

3. The improvement of claim 1 which further comprises a drive system for powering the track, said drive system including;
   a forward wheel serving as a driver pulley rotatably mounted inside the track;
   a hydraulic motor providing power for rotating said driver pulley, and an internal combustion engine for supplying power to said hydraulic motor.

4. The improvement of claim 3 which further comprises a hydraulic cylinder for providing force upon said driver pulley in a direction perpendicular to the axis of rotation of said driver pulley, moving said driver pulley into frictional contact with the track to keep it taut.

5. The improvement of claim 1 wherein said track is mounted upon a series of wheels positioned along the length of the vehicle, at least one of said wheels being of a smaller diameter than the other wheels, said track completely surrounding said wheels such that the inner surface of the track contacts both upper and lower outer surfaces of said wheels as the track rotates about said wheels.

6. The improvement of claim 5 wherein said wheels are filled with bouyant material.

7. The improvement of claim 5 further comprising;
a center ridge extending along the length of the inner surface of said endless track; and
a slot extending about the entire circumference of the outer surface of each of said wheels,
whereby said slot engages said ridge, and maintains the endless propulsion track in a fixed postion relative to the wheels.

8. In a vehicle having an endless drive propulsion track with an outer surface, the improvement comprising:
a series of generally linear segments projecting from the outer surface of the track and extending substantially across the width of the track, the series of segments forming a zigzag pattern along the length of the outer surface of the track whereby, upon driving motion of the track adjacent segments generate propulsion forces having oppositely directed outward lateral components to stabilize the vehicle, the track being supported such that the top surface of the track is substantially linear, the rear portion of the bottom surface of the track is substantially linear and parallel to the top surface of the track, and the forward portion of the bottom surface of the track is substantially linear and sloping upward towards the forward end of the track until it reaches the top surface.

9. A vehicle comprising:
an endless driven propulsion track, including a continuous cleat comprising a series of generally linear segments projecting from the outer surface of the track and extending substantially across the width of the track, each of the segments being disposed at an angle of approximately 90 degrees relative to the immediately adjacent segment, the ends of each of the segments being connected to the ends of each of the adjacent segments, the series of segments forming a zig-zag pattern along the length of the outer surface of the track whereby, upon driving motion of the track adjacent segments generate propulsion forces having oppositely directed lateral components to stabilize the vehicle;
a drive system for powering the track, the drive system including
a forward wheel serving as a driver pulley rotatably mounted inside the track,
a hydraulic motor providing power for rotating said driver pulley, and
an internal combustion engine for supplying power to said hydraulic motor; and
a series of wheels positioned along the length of the vehicle, the track completely surrounding said wheels such that the inner surface of the track contacts both upper and lower outer surfaces of said wheels as the track rotates about said wheels.

10. The vehicle of claim 9 wherein the wheels can be selectively filled with ballast to cause the vehicle to submerge and thereby serve as a submarine.

11. The vehicle of claim 9 wherein the wheels are filled with foam to thereby increase their bouyancy and cause the vehicle to float with the upper portion of the track above water level.

* * * * *